(12) United States Patent
Ferrazzo

(10) Patent No.: US 12,139,224 B2
(45) Date of Patent: Nov. 12, 2024

(54) METHOD AND SYSTEM FOR NEUTRALISING RISING JOLTS SUPPORTED BY A VEHICLE STEERING COLUMN

(71) Applicant: CKP Engineering, Cazeres sur Adour (FR)

(72) Inventor: Julien Ferrazzo, Duhort Bachen (FR)

(73) Assignee: CKP Engineering, Cazeres sur Adour (FR)

( * ) Notice: Subject to any disclaimer, the term of this patent is extended or adjusted under 35 U.S.C. 154(b) by 0 days.

(21) Appl. No.: 18/255,457

(22) PCT Filed: Nov. 29, 2021

(86) PCT No.: PCT/EP2021/083332
§ 371 (c)(1),
(2) Date: Jun. 1, 2023

(87) PCT Pub. No.: WO2022/117495
PCT Pub. Date: Jun. 9, 2022

(65) Prior Publication Data
US 2024/0075982 A1 Mar. 7, 2024

(30) Foreign Application Priority Data
Dec. 5, 2020 (FR) ..................... 2012740

(51) Int. Cl.
*B62D 7/22* (2006.01)
*F16F 15/12* (2006.01)

(52) U.S. Cl.
CPC .......... *B62D 7/224* (2013.01); *F16F 15/1201* (2013.01)

(58) Field of Classification Search
CPC ............................. B62D 7/224; F16F 5/1201
See application file for complete search history.

(56) References Cited

U.S. PATENT DOCUMENTS

| 4,805,478 A | 2/1989 | Beauch |
| 7,823,708 B2 * | 11/2010 | Maranville ............ B62D 7/224 |
| | | 188/267 |

(Continued)

FOREIGN PATENT DOCUMENTS

| DE | 3309437 | 10/1983 |
| EP | 0427915 | 5/1991 |

(Continued)

*Primary Examiner* — Faye M Fleming
(74) *Attorney, Agent, or Firm* — Defillo & Associates, Inc.; Evelyn A. Defillo

(57) ABSTRACT

An arrangement of the column (1) neutralising transient forces (C1, EA1) generated by a jolt to which the column (1) is subjected, by an automatic decoupling between two coaxial sections (1a, 1b) of the column (1). This decoupling is caused by angular movement of a coupling link (5) between the sections (1a, 1b), preventing transmission of the forces (C1, EA1) by a distal section (1a) to a proximal section (1b) of the column (1). Simultaneously with the decoupling, a compression is also caused of a prestressed elastic mounting region (6a) between the sections (1a, 1b), the jolt then no longer being absorbed by the driver but by the compression of the elastic region. The decoupling is followed by an automatic re-coupling between the two sections (1a, 1b) under the effect of the relaxing of the elastic region (6a).

19 Claims, 5 Drawing Sheets

(56) References Cited

U.S. PATENT DOCUMENTS

| | | | | |
|---|---|---|---|---|
| 8,221,250 | B2 * | 7/2012 | Roser | F16F 15/1201 |
| | | | | 464/169 |
| 9,718,493 | B2 * | 8/2017 | Moriyama | B62D 5/0409 |
| 9,789,903 | B2 * | 10/2017 | Moriyama | F16D 3/68 |

FOREIGN PATENT DOCUMENTS

| | | | | |
|---|---|---|---|---|
| FR | 2550505 | | 2/1985 | |
| KR | 20150047984 A | * | 11/2010 | B62D 7/224 |
| WO | WO03/022658 | | 3/2003 | |
| WO | WO-2018087096 A1 | * | 5/2018 | B62D 7/224 |
| WO | WO2019135768 | | 7/2019 | |

\* cited by examiner

METHOD AND SYSTEM FOR NEUTRALISING RISING JOLTS SUPPORTED BY A VEHICLE STEERING COLUMN

CROSS REFERENCE TO RELATED APPLICATION

This application is a national stage entry of PCT/EP2021/083332 filed Nov. 29, 2021, under the International Convention claiming priority over French Patent Application No. FR2012740 filed Dec. 5, 2020.

TECHNICAL FIELD

The invention relates to the arrangement of a steering column of a traveling vehicle whose propulsion is or is not motorized, such as for example motor and/or utilities vehicles, trucks, construction machines, quadricycles, motorcycles, bicycles, scooters or gyropods.

The invention relates more specifically to a method and a system for neutralizing forces generated by transient jolts transmitted to a steering column of a traveling vehicle. Such forces are consecutive to a shock which is briefly supported by at least one drive wheel of the vehicle, and which generates a rise of at least one transient jolt which it is appropriate not to transmit to the driver of one of said vehicles via the steering column.

PRIOR ART

Traveling vehicles are commonly equipped with a steering column via which a driver steers the vehicle. Said column is arranged as a rotating shaft able to include several sections successively coupled together via a plurality of mobile coupling elements interposed between the sections as described in the patent document DE 33 09 437 A1. The column can be rotationally maneuvered by a device for controlling trajectory changes of the vehicle—such as a steering wheel or handlebar—which can be operated by the driver of the vehicle.

The control device is mounted on the column, at its axially proximal end, via a reception support—called steering wheel support—provided in a terminal portion of the column. The other distal axial end of the column is connected to a drive wheel of the vehicle—for example for cycles, scooters or gyropods—or to an axle of drive wheels—for example for motor vehicles and quadricycles. This makes it possible to orient on the ground the drive wheel or wheels of the vehicle depending on the amplitude of the rotational movement impressed by the driver on the steering column via the control device.

In the event of an accident causing a violent shock susceptible of injuring the driver, the latter can be protected against any transmission of the shock through the steering column. For example, as described in the patent document U.S. Pat. No. 4,805,478, the column is arranged as a telescopic device whose sections are successively coupled, axially and rotationally. In the event of a violent frontal impact suffered by the vehicle, the resulting axial thrust causes axial interlocking of the sections, successively one into the other.

In motor vehicles, the steering column is usually connected to an axle of drive wheels via a power steering system. Using such a system facilitates the driver's task in steering the vehicle and improves driving comfort by demultiplying the forces to be produced via an electric or hydraulic motor. Power steering systems limit the efforts the driver must make to steer the vehicle and can control the trajectory of the vehicle so as to improve its stability when moving forward.

In order to operate, the power steering system potentially has information relating to the torque applied to the steering column by the steering wheel comprising the control device, as described in the patent documents WO03/022658 and FR2550505. Account is taken in particular of a potential angular offset between the steering wheel and the column when they are rotationally coupled together via a device deformable under torsion.

Furthermore, the vehicles are also potentially subjected to repeated vibrations when advancing, which are more or less considerable depending on their aerodynamism and/or the quality of the shock absorbers that equip them. Such is the case in particular when the vehicle moves forward on an uneven traffic lane, such as for example a paved road. Such vibrations can affect the driving comfort of the vehicle. In order to remedy this disadvantage, a proposal was made to equip a steering wheel with elastic bodies making it possible to absorb such vibrations transmitted to the steering wheel by the column, as described in the patent documents EP0427915 and WO2019135768.

However, a general problem persists in absorbing forces caused by brief shocks suffered occasionally by one or more drive wheels of the vehicle and sufficiently violent to be felt in the steering control device. Such occasional shocks are caused for example by unevenness of the traffic lane—such as humps and/or cavities commonly designated "potholes"—or for example curb impacts or when a drive wheel moderately hits an obstacle.

Such shocks thus generate sudden transient jolts transmitted to the steering column, of non-negligible although limited amplitudes. Since the power steering systems equipping the motor vehicles are not able to absorb such jolts, these are transmitted to the column at its distal end. Consequently, the transient forces generated by such jolts travel up the length of the column to the driver maneuvering the control device mounted on the steering mounting of the proximal end of the column.

Oversizing the power steering system so as to neutralize such jolts is not appropriate on account of the brief nature and limited amplitude of such jolts, which what is more are occasional. In fact, this would result in disproportionate complexification and a significant increase in the weight and spatial requirement of the power steering system, as well as a risk of blocking the rotation of the steering column. Since the power steering system is installed in the engine compartment of the vehicle, adapting it to neutralize the jolts therefore seems prohibitive.

An attempt is thereupon made to prevent the transmission to the driver of jolts transmitted to the control device by the steering column—as a result of a shock briefly applied against at least one drive wheel of the vehicle as it moves forward, and at the same time—for motor vehicles—avoiding using a power steering system with which the steering column is usually in contact via its distal end.

As a reminder, the terms "distal" and "proximal" are relative notions gauged in terms of the main extension of the steering column, the control device being conventionally installed at the proximal end of the column and the distal end of the column being in contact—directly or indirectly—with at least one drive wheel of the vehicle.

SUMMARY OF THE INVENTION

The invention aims to remedy the inadequacies of the prior art concerning the transmission to the control device maneuverable by the driver—such as a steering wheel, a lever or a handlebar—of rising transient forces from the distal end of the column when it is subjected to at least one sudden jolt at that end. Such peaks of transient forces—brief in duration and at regular intervals—can generate in particular jamming of the steering, brief angular accelerations of the control device and/or sudden vibrations which are then felt by the driver of the vehicle.

The invention aims to remedy one and/or the other of these disadvantages and to provide a solution:
which is entirely mechanical while being able automatically to neutralize the transient forces before they are transmitted to the control device;
which can easily be adapted to any traveling vehicle in terms of its own characteristics relating for example to its weight, the methods of connecting the column to at least one wheel of the vehicle and/or the propulsion means of the vehicle which means can be motorized—with different engine powers depending on the vehicle—or which means can be provided by the driver by muscular strength;
which is autonomous and can be mounted at any point on the steering column, without noticeably increasing the weight of the steering assembly.

In order to achieve this, the transient forces are used according to the invention to cause, simultaneously, that is to say at the same time, and jointly:
rotational decoupling between detachably connected coaxial column sections by capturing the energy transported by the jolt so as to detach them from their connection and thereby cut off the transmission of transient torque forces, and
a start of elastic axial compression between the sections decoupled in this way, this elastic compression being immediately followed by a relaxing, which causes, by reverse kinematics, a re-coupling of the sections.

In this regard, the object of the invention is a method for neutralizing transient forces generated by a rise, between a distal end and a proximal end of a steering column of a vehicle, of at least one sudden jolt caused, from the distal end of the column, by a shock suffered by at least one drive wheel connected to said column.

A steering device for controlling the trajectory followed by the vehicle is mounted on the proximal end of the column, this device being rotationally operable by the driver of the vehicle.

According to the method of the invention, the following operations are performed:
in a state of coaxial coupling on a central axis of the column, mount, in accordance with a reference torque, via a mobile coupling link, at least two sections of column, a distal section with a proximal section rotationally integral with the control device, and provide a pre-stressed elastic region axially between the sections mounted in the coupling state in accordance with the reference torque,
under the effect of a start of rotation of the distal section by a transient torque greater than the reference torque, cause an automatic decoupling between the distal and proximal sections by rotationally driving the coupling link subjected to the transient torque and by helical guidance of this link in the proximal section, and
simultaneously, under the effect of the decoupling between the sections, drive the coupling link on the distal section in translation by double combined guidance under axial displacement in the distal section and helically in the proximal section, to the elastic region so as to compress the latter axially between the sections, the compression being greater than a compression threshold corresponding to its prestressing, then
as a result of the cessation of the jolt and correlatively of the exhaustion of the transient forces, cause an automatic re-coupling between the sections by relaxing the compressed elastic region, said region being returned to its pre-stressing threshold between the sections coupled under the reference torque and the coupling link being returned to the state of coupling of the sections with each other.

In the present text, the qualifier "proximal" relates to the position of a structure element closer to the control device than a position qualified as "distal" of another corresponding structure element, for example two ends, of the same component or another component.

By applying the method of the invention, an automatic decoupling and re-coupling is therefore obtained between the sections, using only the energy developed by the jolt and the intrinsic elasticity of the elastic region. Since the coupling link is rotationally linked with the distal section and doubly guided—helically in the proximal section and in axial translation with the distal section—the actual jolt automatically provokes a start of relative rotation between the sections, therefore blocking any transmission of the transient torque to the proximal section from the distal section.

The helical guidance makes it possible in particular to exert on the mobile link a thrust along a component in axial translation, which drives the link in axial guidance of the distal section to the elastic region as a result of the decoupling of the sections, then to the re-coupling position of the sections through the reverse thrust exerted by the elastic region as it relaxes.

From the method of the invention, it emerges that in the event of a jolt supported by the distal section, the transient forces are used to cut off the coupling between the sections automatically and inversely to cause them to re-couple due to the relaxing of the elastic region. The transient forces are therefore neutralized before they are transmitted to the proximal section.

The control device rotationally integral with the proximal section is therefore protected from transmission of the jolt while avoiding any feeling by the driver of the vehicle. Such neutralization is obtained mechanically without applying any energy outside that generated by the transient forces.

Advantageously, when the transient forces are susceptible of including an axial force component generator of an axial thrust exerted on the distal section, the compression of the elastic region also allows absorption of such an axial thrust.

According to a preferred embodiment of the method of the invention, which uses the fact that the jolts generate angular offsets on the entire circumference of the column, the coupling link is angularly distributed in a uniform manner on a plurality of interfaces of mobile coupling between the sections along a circumference.

These mobile interfaces are guided to circulate rotationally and in axial translation, under the effect of a start of rotation of the distal section with respect to the proximal section, under the following reverse kinematics.

In accordance with "go" kinematics, each mobile interface moves in curvilinear guidance by at least one helix portion of angular range limited along the proximal section, which allows each mobile interface also to move to the elastic region through an individual axial guide on the distal section until these interfaces abut the elastic region, which produces axial absorption of the transient forces.

Then, as a result of the cessation of the jolt, the re-coupling between the sections is caused according to "return" kinematics, the reverse of the "go" kinematics, by the elastic region relaxing to its pre-stressed threshold. The mobile interfaces are then pushed back by guidance on the distal section in reverse axial translation and reverse curvilinear guidance along the proximal section until the state of coupling of the sections with each other is re-established under the reference torque.

Such a uniform distribution of the mobile interfaces also assists the axial abutment of the mobile interfaces during elastic compression, which is then distributed in a uniform manner.

It is specified that the start of axial translation of the mobile interfaces is achieved along directions coaxially parallel to the central axis of rotation of the sections. The coupling link or the interfaces are called mobile in so far as "mobile" means "able to move".

According to an advantageous embodiment, in the case where the sections are held in the decoupled state, priority coupling between the sections can be brought about by holding the mobile coupling interfaces at one end of their angular range of the proximal section, starting with a rotational maneuver operated by the driver or an operator of the proximal section via the control device.

This embodiment allows the driver to be able, for safety reasons, in any situation, to drive the column rotationally through the distal section driven in turn by the proximal section, for example in the event of the sections jamming in the decoupled state, or in the event of jolts applied to the column at regular intervals, holding the sections in the decoupled state. The driver can therefore constantly control the trajectory of the vehicle through the control device.

An object of the invention is also a coupling system, axial and rotational between a distal section and a proximal section of a steering column of a vehicle, designed to implement a method such as has just been described.

Such a coupling system is recognizable mainly in that said sections are at least partially coaxially interlocked and coupled by assembly one inside the other, defining an interlocking region. An elastic device which comprises said elastic region is mounted axially prestressed between the sections. These sections are coupled together rotationally via a plurality of mobile coupling elements comprising the coupling link, radially and uniformly interposed between the sections in their interlocking region.

The coupling elements, rotationally linked with the distal section, are assembled mobile on this distal section along axial guides uniformly distributed peripherally on this same distal section. And these coupling elements are jointly mounted mobile on the proximal section in guides in curvilinear circulation along helix portions extending individually, from a position of coupling together of the sections at the reference torque, up to at least one angular stop. In curvilinear circulation, each mobile element is in a decoupled position of the sections in angular offset and in axial offset with respect to its coupling position, the elastic device being compressed in a decoupling position of the sections by axially abutting mobile elements.

It is understood here that the coupling elements, the axial guides and curvilinear guides are identical. Furthermore, it seems to be given, in the context of the invention, that the distal section is rotationally integral with the distal end of the column, which is linked—directly or indirectly—to at least one wheel of the vehicle, and that the proximal section is rotationally integral—directly or indirectly—with the control device. Such a set of sections can be positioned on the column at any location situated between its distal and proximal ends.

Advantageously, each helix portion of the curvilinear guide of the proximal section is in the shape of a "V", comprised of two thrust wings inclined towards the common axis of the sections. These wings extend symmetrically on both sides of the coupling position between sections that is assigned to each portion. Each of said wings has an angular stop as its end, the coupling position being the position of each guide the most distant from the elastic region and the positions of the stops being the closest. Each mobile element is therefore mounted to circulate between the coupling position and either one of the angular stops of the distal section in the direction of rotation of this section.

According to preferred embodiments:
the curvilinear guides of the proximal section and the axial guides of the distal section are formed of elongate cavities, hollow on the surface, and are equipped with side walls, the curvilinear guides preferably having at least one side wall forming a longitudinal stop which makes it possible to exert an axial abutment contact on the mobile elements in the direction of the elastic region;
in the interlocking region, the distal section is equipped at its proximal end with an axial interlocking shaft extending inside a collar included in the proximal section, the curvilinear guides being provided on an inner face of the collar and the axial guides on an outer face of the shaft facing said inner face;
the sections are axially immobilized, coupled together according to a predefined permanent axial mounting position: this axial immobilization of the sections in relation to each other assists the robustness of the coupling system during functioning and limits fatigue of same in the event of jolts; such an arrangement also allows the axial spatial requirement of the coupling system to be limited—and therefore assists its installation on the column of any traveling vehicle—at the same time allowing the coupling elements to be used to compress the elastic device in the decoupled state of the sections.

The proximal section is axially located to abut the elastic device via the coupling elements, along a chain of successive axial abutments between the components of the coupling system, this chain being organized to place the elastic mounting device prestressed between the sections in the coupled state and compressed by the coupling elements in the decoupled state of the sections.

According to an advantageous embodiment, the coupling system therefore features the following components so as to form a chain of axial abutments:
the elastic device axially interposed between a first stopper integral with the distal section and a second stopper mounted around the distal section;
the first stopper being comprised of a proximal face of a distal nut and the second stopper abuts the coupling elements, which in turn abut the longitudinal stop wall of the curvilinear guide assigned to them;
the distal section and the proximal section are axially immobilized in relation to each other between the nuts which are screw-mounted around the distal section, whose distal nut and a proximal nut are placed on either side of the proximal section; and
the elastic device is prestressed between the distal nut and the proximal section.

According to variants, the second stopper can be comprised of a distal face of the collar of the proximal section or by a distal face of a third shoulder which includes a sleeve mounted to slide axially around the distal section.

In the first case, the helix portions for circulating the coupling elements in the proximal section are comprised of sliders having two parallel side walls, including a distal wall which abuts the coupling elements and the longitudinal stop proximal wall provided by a distal face of a second shoulder of the collar. In this case, the coupling elements are in direct contact with the elastic device.

In the second case, each helix portion includes a ramp having only the longitudinal stop proximal wall provided in the same way as in the first case, the sleeve which acts as second stopper having a step which extends axially to abut the coupling elements.

A running gear is preferably radially interposed between the distal section and the proximal section at their proximal end. Such a running gear advantageously includes an inner ring, axially blocked between the proximal nut and a first shoulder of the distal section, and an outer ring, axially blocked between a second inner shoulder formed on the proximal section and a flange axially fastened to the proximal section at its proximal end.

The quality of the start of movement of the mobile elements which can be running or sliding, in helical circulation on the proximal section and in axial translation on the distal section, is optimized while limiting the overall weight and/or the wear of the coupling elements.

An object of the invention is also a steering column of a vehicle including at least one set of sections, including a distal section and a proximal section, coupled to each other rotationally and axially. Such a steering column relating to the invention is recognizable in that said sections are coupled together via a coupling system such as has just been described.

The coupling system is preferably installed on the column at its proximal end, the proximal end being advantageously arranged to support said device for controlling the trajectory followed by the vehicle.

In this context, another object of the invention relates to a traveling vehicle equipped with a steering column connected at is distal end to at least one wheel of the vehicle and equipped at its proximal end with a device for controlling the trajectory followed by the vehicle. Such a traveling vehicle is recognizable in that the steering column conforms to the description that has just been made of it.

BRIEF DESCRIPTION OF THE DRAWINGS

Other characteristics and advantages of the invention will emerge on reading below of a detailed embodiment example with reference to the following figures which respectively show.

DETAILED DESCRIPTION OF THE INVENTION

The figures and their detailed, non-limitative descriptions, reveal the invention according to particular modalities which are not restrictive in respect of the scope of the invention. The figures and their detailed descriptions of an embodiment example of the invention can help to define it better, if necessary in relation to the general description which has just been made thereof.

Furthermore, in order to avoid overloading the figures and to facilitate the reading thereof, the reference numbers assigned to the terms and/or notions used to describe the invention and indicated on any one of the figures are potentially repeated in the description of any other figure without implying that they are present on all of the figures.

Figure 1:
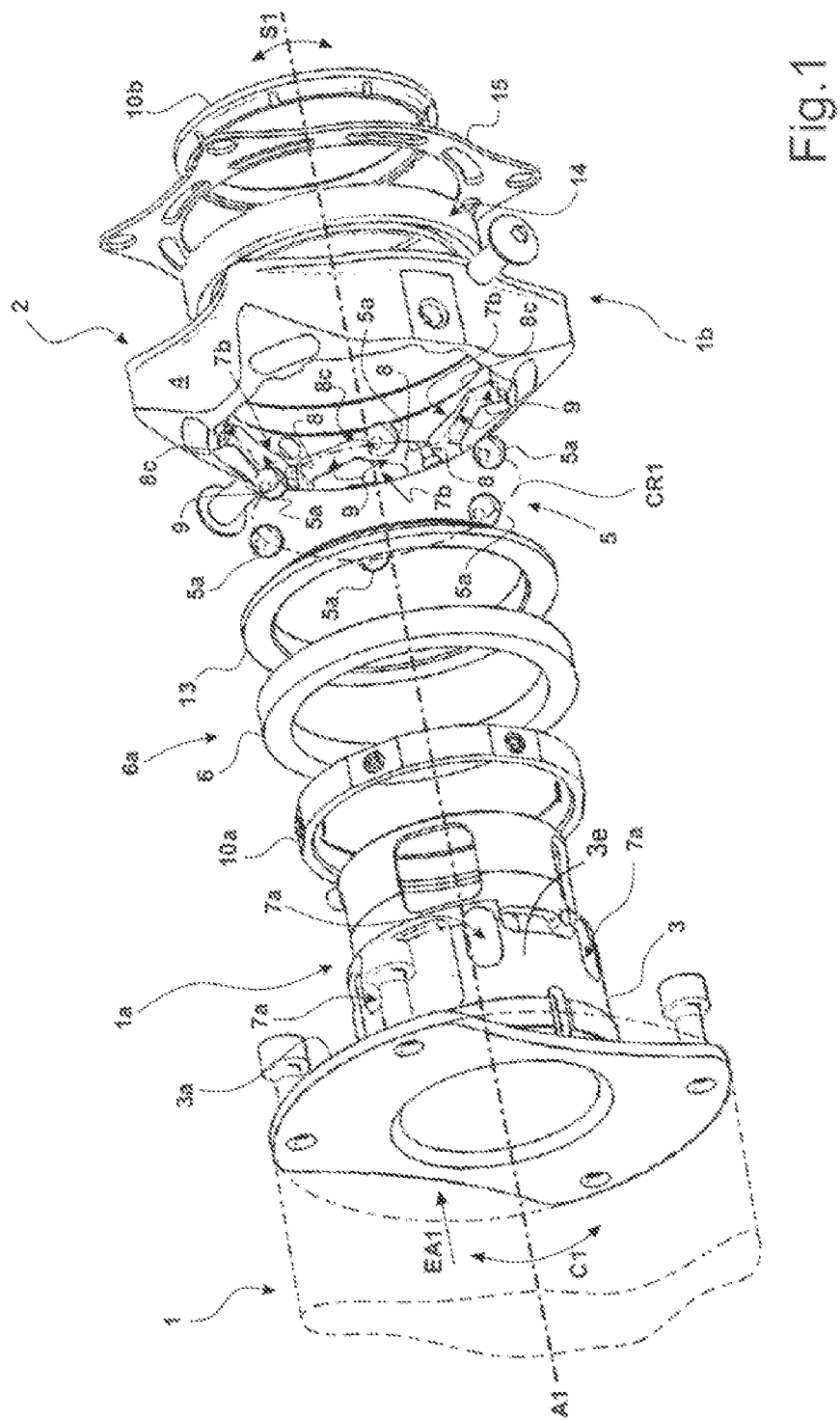
FIG. 1 shows an exploded front view of the coupling system according to the invention for installation on a steering column of a motor vehicle at its proximal end, while providing a mounting of a wheel for steering the trajectory followed by the vehicle.
Figure 2:
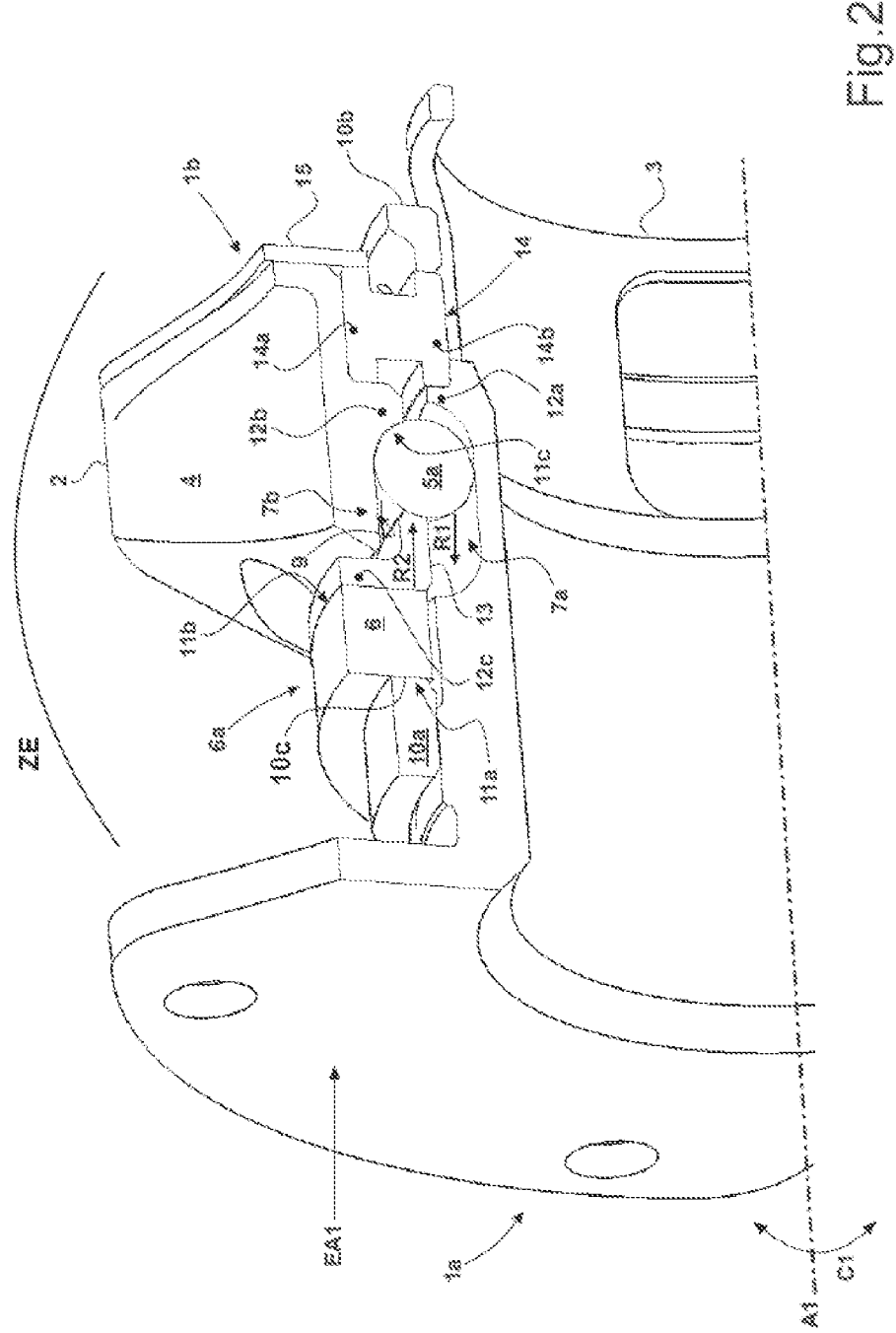
FIG. 2, an axial view in half-section of the coupling system shown on FIG. 1, slightly axially inclined.

On FIGS. 1 and 2, a column 1 for steering a motor vehicle is coupled rotationally and axially with a mounting 2 of a wheel for controlling the trajectory followed by the vehicle, in this case a steering wheel. The driver of the vehicle can rotationally maneuver said steering wheel so as to drive the column 1 rotationally and therefore to steer the vehicle. In line with tradition, the distal end of the column 1—not illustrated—is connected to at least one drive wheel of the vehicle, directly or indirectly, for example via a power steering system equipping a motor vehicle.

For this purpose, a proximal end of the column 1 is provided with a distal section 1a arranged in a shaft 3 equipped with a fastening plate 3a. As shown in FIG. 2, the shaft 3 is partially interlocked coaxially along the central axis A1 inside a proximal section 1b including a collar 4 forming said mounting 2. The coaxial interlocking between the distal section 1a and the proximal section 1b is achieved along a common axis which merges with the central extension axis A1 of a coupling system according to the invention.

Figure 1A:
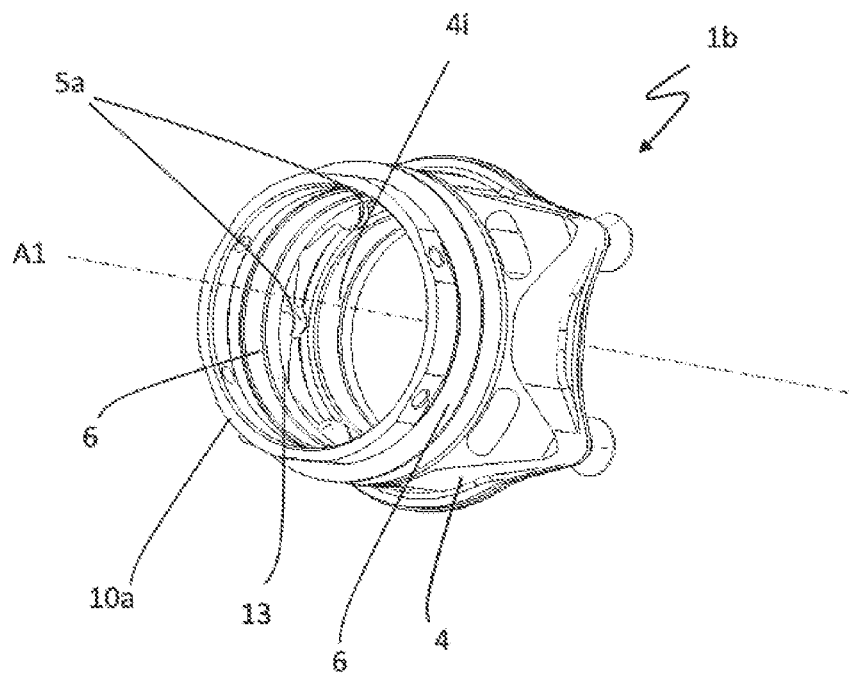
FIG. 1a shows a perspective front view of the coupling system of FIG. 1.
Figure 1B:
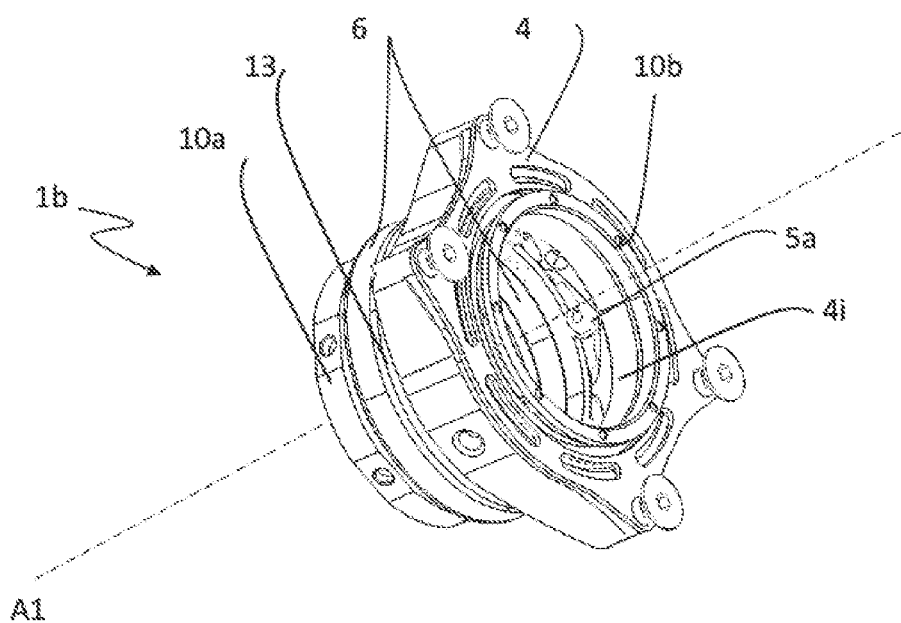
FIG. 1b shows a perspective rear view of the coupling system of FIG. 1.

On FIGS. 1a and 1b oriented according to distal viewpoints, and respectively proximal, only the proximal section 1b appears once assembled. These FIGS. 1a and 1b show the compactness of the coupling system according to the invention, the distal section 1a being assembled inside the proximal section 1b (except for the fastening plate 3a which emerges radially from the nut 10a of the proximal section 1b, see FIG. 2).

The methods of assembly between the distal section 1a and the proximal section 1b between them provide the installation of their coupling system obtaining automatic decoupling followed by automatic re-coupling between the sections 1a, 1b in the event of transient jolts supported by the column 1 at its distal end.

Such jolts occur in particular when the vehicle travels on a road displaying unevenness, and the invention aims to prevent their transmission through the steering wheel to the driver in order not to affect his/her driving comfort. The jolts generate transient forces which are briefly supported by the column 1 and which the invention aims to neutralize so as to prevent their transmission to the proximal section 1*b* by the distal section 1*a*. Such transient forces generate a transient torque C1 of rotational driving of the distal section 1*a* and a transient axial force EA1 axially supported by the distal section 1*a*.

In assembled state between the distal section 1*a* and the proximal section 1*b*, the sections 1*a*,1*b* are rotationally coupled under a predefined reference torque. In the case where the transient torque C1 is greater than the reference torque, this automatically causes a decoupling between the sections 1*a*, 1*b*. The transient forces are then neutralized for the duration of application of the jolts on the column 1—which prevents their transmission to the proximal section 1*b*—the decoupling between the sections 1*a*, 1*b* being followed by an automatic re-coupling of the sections 1*a*, 1*b* with each other as a result of the cessation of the jolt.

For this purpose, the distal section 1*a* and the proximal section 1*b* are assembled in positions in a state of coupling between them, as illustrated on FIG. 2. In the coupled state, the driver can steer the motor vehicle by maneuvering the steering wheel and can then drive the column 1 rotationally via the coupling described below between the distal section 1*a* and the proximal section 1*b*.

In the assembled position and therefore in the coupled state of the sections 1*a*, 1*b* with each other, the sections 1*a*, 1*b* are rotationally coupled with each other via a link 5 consisting of a plurality of coupling elements 5*a* configured as balls. An elastic device 6—such as one in the shape of a ring in elastomer for example—is axially interposed, prestressed, between the sections 1*a*, 1*b*, providing between them an elastic compression region 6*a*.

Figure 3:
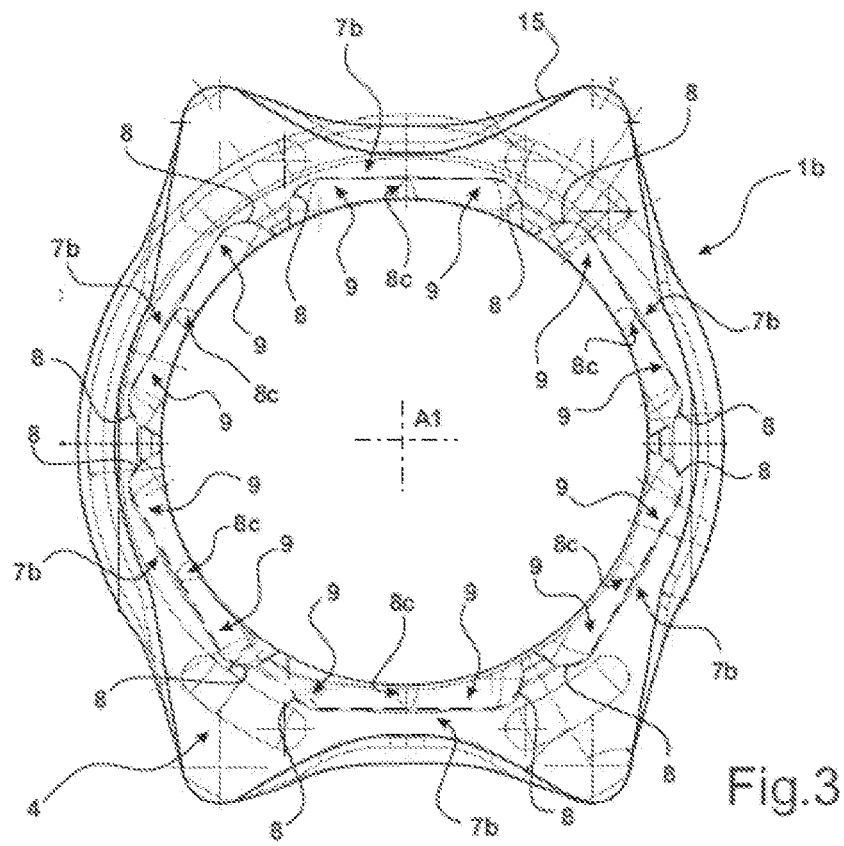
FIG. 3, a front view of a proximal section of the coupling system shown on FIGS. 1 and 2, said proximal section being arranged as a collar forming the steering wheel mounting.
Figure 4:
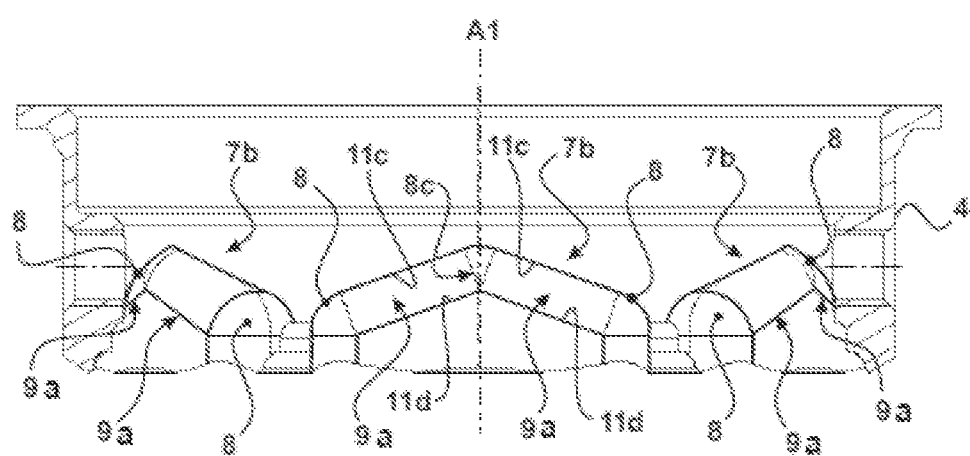
FIG. 4, an axial section view of the proximal section comprised of the participating collar of the coupling system shown on FIG. 3.
Figure 5:
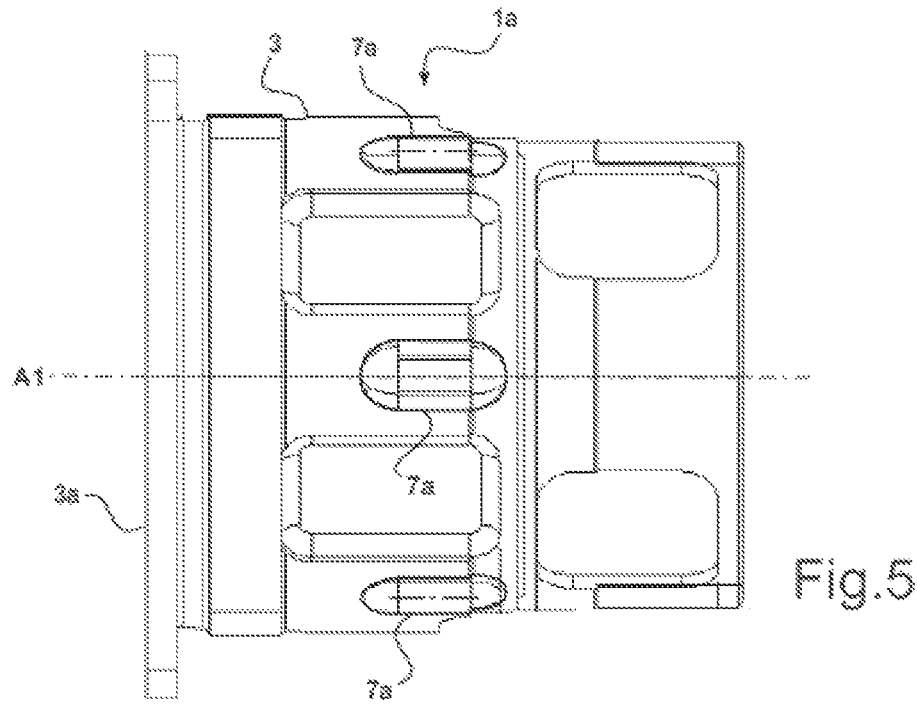
FIG. 5, an axial view of a shaft forming a distal section of the coupling system shown on FIGS. 1 and 2, the distal section being arranged for assembly on the proximal end of the steering column, and FIG. 6, a front view of the shaft shown on FIG. 5.
Figure 6:
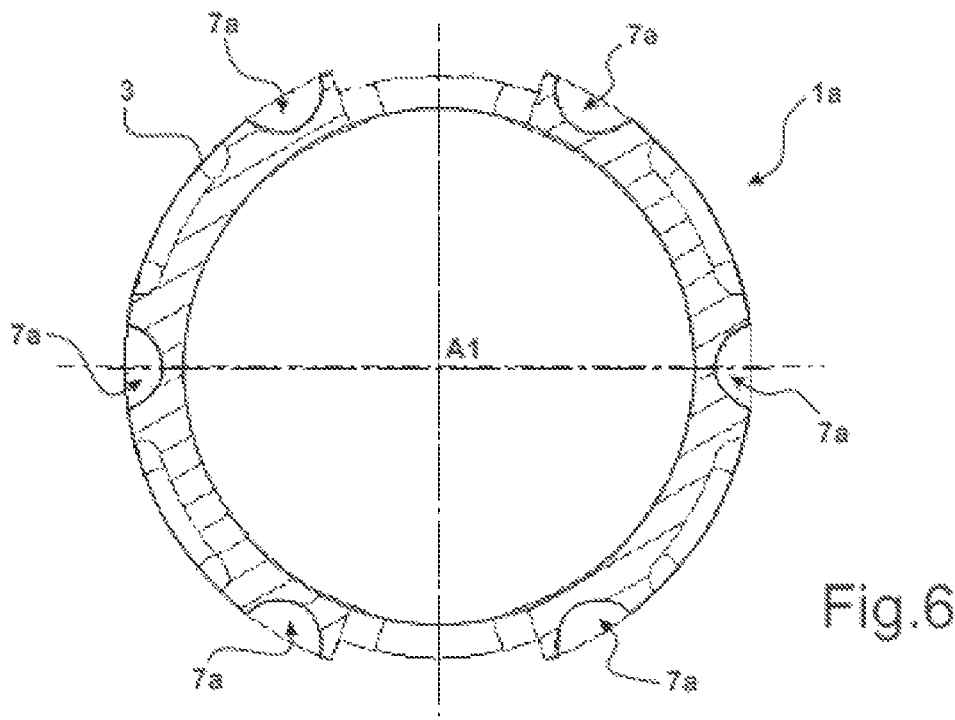

The coupling balls 5*a* axially abut the elastic device 6, of which the prestressing at least holds the coupling balls 5*a* in a coupling position 8*c* in the coupled state of the sections 1*a*, 1*b* with each other as marked on FIG. 1 and FIGS. 3 and 4.

The proximal section 1*b* is axially immobilized on the distal section 1*a*, while being permanently held in a predefined permanent axial position with respect to the distal section 1*a*. It is specified here that the relative axial position between the sections 1*a*, 1*b* remains whatever the situation of setting the coupling state or of setting the decoupling state between the sections 1*a* and 1*b*.

The coupling balls 5*a* are radially interposed between the sections 1*a*, 1*b*, in the interlocking region ZE between the shaft 3 and the collar 4 (see FIG. 2). The coupling balls 5*a* are angularly distributed around a circumference CR1 in the interstitial space between the sections 1*a*, 1*b*.

The coupling balls 5*a* are individually accommodated inside a set of guides 7*a*, 7*b*, included respectively in the outer face 3*e* of the shaft 3 of the distal section 1*a* and the inner face 4*i* of the collar 4 of the proximal section 1*b*. Each one of the set of guides 7*a*, 7*b* comprises an axial guide 7*a* and a curvilinear guide 7*b*.

The axial guides 7*a* are guides for circulation in translation of the coupling balls 5*a* peripherally provided on the shaft 3—as shown on FIGS. 1-2 and FIGS. 5-6. The curvilinear guides 7*b* are provided on the inner face 4*i* (see FIGS. 1*a* and 1*b*) of the collar 4—as shown on FIGS. 1-2 and FIGS. 3-4. The curvilinear guides 7*b* are guides for helical circulation of the coupling balls 5*a* with respect to the proximal section 1*b* and under load to push the coupling balls 5*a* axially, causing axial circulation thereof inside the axial guides 7*a* of the distal section 1*a* to the elastic device 6 during decoupling of the sections 1*a*, 1*b*.

The curvilinear guides 7*b* extend substantially along circumferential arcs generally oriented around said circumference CR1 of angular distribution of the coupling balls 5*a* as shown on FIG. 1. Cavities open one to the other are formed for each set of guides 7*a*, 7*b*, the axial guide 7*a* and the curvilinear guide 7*b*—including respectively one axially oblong cavity relating to the axial guides 7*a* and one cavity configured in at least one helix portion relating to the curvilinear guides 7*b*—which jointly accommodate the coupling ball 5*a* assigned to them.

On FIGS. 1 and 3-4, the curvilinear guides 7*b* each extend on a limited angular range between their blind ends which provide angular stops 8. The angular stops 8 are distributed equidistantly on both sides of the coupling position 8*c* of the coupling balls 5*a*.

More precisely, each of the helix portions of the curvilinear guides 7*b* is comprised of two ramps 9 which extend symmetrically on both sides of the coupling position 8*c* of the coupling balls 5*a*, such that the ramps 9 form the two wings of a curvilinear guide 7*b* in a "V" shape, the point of which provides said coupling position 8*c*. In this sense, the ramps 9 are called "inclined"—with respect to a plane perpendicular to the central axis of rotation A1 of the sections 1*a*, 1*b*—from the coupling position 8*c* of the coupling balls 5*a* to the axis of rotation A1. On FIGS. 3 and 4, the ramps 9 are substantially each configured as helix sections, but appear rectilinear because of the frontal orientation and the orientation in axial section of the views.

The coupling position 8*c* of the coupling balls 5*a* is provided in the junction region between the ramps 9 which are concurrent at this coupling point. This coupling position 8*c* is more distant from the elastic device 6 than the angular stops 8. The coupling balls 5*a* circulate according to the direction of rotation of the distal section 1*a* along one or other of the ramps 9 of each curvilinear guide 7*b* from the coupling position 8*c* which is common to them.

Depending on the value of the reference torque—or in other words the prestressing threshold of the elastic region 6*a* between the sections 1*a*, 1*b*—an arrangement of the shape of said junction region between the ramps 9 of two consecutive guides 7*b* can be advantageously envisaged to form a device for holding the coupling balls 5*a*, assisting in holding them in the coupling position 8*c* inside the curvilinear guides 7*b* when the sections 1*a*, 1*b* are positioned in the state of coupling with each other, in accordance with the reference torque.

The axial guides 7*a* therefore authorize mobility of the coupling balls 5*a* in axial translation on the distal section 1*a* on the periphery of the shaft 3 and in inclined rotation with respect to the proximal section 1*b* with the coupling balls 5*a* being driven by the distal section 1*a*. Simultaneously and jointly, the curvilinear guides 7*b* mobilize the coupling balls 5*a* against the inner side 4*i* (see FIGS. 1*a* and 1*b*) of the collar 4 via the ramps 9, along a substantially helical trajectory following a limited angular range between the angular stops 8.

As shown on FIG. 2, the collar 4 is permanently held on the shaft 3 in said permanently assembled axial position—between two nuts 10*a*, 10*b* which are screwed to the shaft 3 respectively at each of the axial ends of the coupling system.

A permanent relative axial position is therefore obtained between the distal section 1*a* and the proximal section 1*b*. The elastic device 6 of prestressed mounting is axially interposed via the coupling balls 5*a*, between a first stopper 11*a* and a second stopper 11*b* axially abutting on both sides of the elastic device 6.

The first stopper 11*a* is comprised of a proximal face 10*c* of the distal nut 10*a* which abuts a distal face of the elastic device 6. The second stopper 11*b* is comprised of a distal face of a third shoulder 12*c* included in a sleeve 13 or, alternatively in an example without sleeve, the distal face is the distal face of the collar 4.

The sleeve 13 is mounted to slide axially around the shaft 3 while extending axially, partially overhanging the axial guides 7a. The sleeve 13 is axially interposed between a proximal face of the elastic device 6 and the coupling balls 5a. Each coupling ball 5a in turn axially abuts the stop 11c comprised of a longitudinal wall provided by a second inner shoulder 12b formed inside the collar 4 included in the proximal section 1b.

It will be noted that, particularly visible on FIG. 4, the curvilinear guides 7b can, in a variant, be arranged as a slider 9a to assist mobility guidance of the coupling balls 5a on the proximal section 1b. Such sliders 9a can be comprised of providing second distal walls 11d of the collar 4 oriented parallel to the walls of the second shoulders 12b forming the longitudinal stops 11c.

The second walls 11d have a radial extension adapted so as not to obstruct the circulation of the coupling balls 5a inside the axial guides 7a or their abutment against the elastic device 6. In this variant, the second stopper 11b is comprised of a distal face of the collar 4 which replaces the sleeve 13 and the second distal walls 11d abut the coupling balls 5a.

In the coupled state of the sections 1a, 1b together, the coupling balls 5a are held in their coupling position 8c under the effect of the prestressing of the elastic device 6 against which the coupling balls 5a abut axially.

In the decoupled state of the sections 1a, 1b under the effect of jolts supported by the column 1, the coupling balls 5a circulate inside one or other of the ramps 9 of the curvilinear guides 7b according to the direction of rotation of the distal section 1a with respect to the proximal section 1b, while being held axially abutting the longitudinal stops 11c and the elastic device 6 so as to compress it at a compression threshold greater than the prestressing of the elastic device 6.

A roller device 14 is radially interposed between the shaft 3 and the collar 4. An outer ring 14a of the roller device 14 is axially interposed between the proximal face of the second shoulder 12b and a flange 15 fastened to the collar 4. An inner ring 14b of the roller device 14 extends axially in interposition between a proximal nut 10b and a first shoulder 12a included in the shaft 3 of the distal section 1a.

In other words, as illustrated on FIG. 2, the coupling balls 5a adopt radially opposed abutments at the bottom of the axial guides 7a and at the bottom of the curvilinear guides 7b while obtaining coupling between the sections 1a, 1b in the absence of jolts supported by the column 1. Following the axial extension of the coupling system, axial abutting takes place successively between the nuts 10a, 10b while the collar 4 is permanently held around the shaft 3 in a permanent axial position, whether in coupling position or decoupling position of the sections 1a, 1b.

Therefore, following a line of successive axial abutments:
the elastic device 6 is axially interposed, prestressed, between the distal nut 10a and the sleeve 13, the sleeve 13 in turn axially abutting the coupling balls 5a, they in turn axially abutting the axial stops 11c provided by the second shoulder 12b included in the collar 4;
the collar 4 axially abuts the outer ring 14a of the roller device 14 via the second shoulder 12b, said outer ring 14a in turn abutting the flange 15 which is fastened to the collar 4 at its proximal end, and the collar 4 axially abuts the shaft 3 via the inner ring 14b of the roller device 14 which is axially clamped against the first shoulder 12a of the shaft 3 by the proximal nut 10b.

Such abutting of the coupling balls 5a on one hand radially opposed at the bottom of the axial guides 7a and the curvilinear guides 7b, and on the other axially along said line of axial abutments, is sustained both in the coupled state and in the decoupled state between the shaft 3 and the collar 4.

Therefore, in a coupling system such as the one in the embodiment example that has just been presented, decoupling between the shaft 3 and the collar 4 takes place automatically when a transient torque C1 caused by a jolt suffered by the distal section 1a exceeds the reference torque. Said decoupling is automatically followed by a re-coupling between the shaft 3 and the collar 4 at the end of application of the jolt on the column 1, each ball 5a returning to its coupling position 8c.

In the coupled state of the sections 1a, 1b with each other at the reference torque conforming to the mounting position between the shaft 3 and the collar 4, the coupling balls 5a are held in their coupling position 8c on the collar 4 and in axial position between the walls 11c, 11d of the sliders 9a forming the curvilinear guides 7b or, returning to the example illustrated in particular by FIGS. 1 and 2, between the sleeve 13 and the longitudinal stops comprised of the walls 11c provided in this example by the second shoulder 12b included in the collar 4. The driver can thereupon drive the column 1 rotationally via the steering wheel mounted on the collar 4, following one and/or other of the directions of rotation of the column 1 for steering the vehicle.

When a transient torque C1 caused by a jolt supported by the column 1 at its distal end exceeds the reference torque, the shaft 3 is rotationally driven along one or other of its directions of rotation according to the direction of application of the transient torque C1 to the column 1. Relative rotational mobility of the column 1 with respect to the mounting 2 is authorized by the coupling balls 5a circulating inside the curvilinear guides 7b included in the collar 4, on an angular plane limited to the extension of the curvilinear guides 7b between the coupling position 8c of the coupling balls 5a and one or other of the angular stops 8.

Under the effect of the transient torque C1 applied to the distal section 1a, automatic decoupling is therefore achieved between the distal section 1a and the proximal section 1b which prevents transmission of the transient torque C1 to the collar 4 through the shaft 3. Furthermore, the coupling balls 5a circulating inside the curvilinear guides 7b radially abut one or other of the ramps 9 along the relative direction of rotation between the sections 1a, 1b, while being held axially, abutting with force the longitudinal stops 11c along the path followed by the coupling balls 5a against the ramps 9.

The circulation of the coupling balls 5a along the ramps 9 causes a backwards push R1 thereof (see FIG. 2) and thereafter circulation thereof inside the axial guides 7a to the elastic device 6. The coupling balls 5a then circulate angularly with force along the ramps 9. The effect of this is to cause them also to be displaced in translation inside the axial guides 7a in the direction of the elastic device 6. The travel in translation of the balls or other coupling elements 5a inside the axial guides 7a is extemporaneously determined according to the angular offset between the sections 1a, 1b, the latter determined in turn according to the amplitude of the transient torque C1 applied to the distal section 1a.

The coupling balls 5a then axially abut the sleeve 13 which is axially pushed back by the coupling balls 5a against the elastic device 6. The effect of this is also to absorb the axial forces EA1 generated by the transient forces to which the column 1 is subjected. From the application to the distal section 1*a* of a so-called transient torque C1 greater than the reference torque, the following are obtained simultaneously:

not only absorption of the torque forces generated by the jolt by automatically decoupling the sections 1*a*, 1*b* by helical circulation of the coupling balls 5*a* inside the curvilinear guides 7*b*, but also axial absorption of the axial forces EA1 generated by the jolt, preventing transmission thereof to the proximal section 1*b* by the distal section 1*a* by axially abutting the coupling balls 5*a*, which are axially pushed back R1 by the ramps 9, against the elastic device 6.

When the column 1 is no longer subjected to a jolt, this causes a reverse circulation of the coupling balls 5*a* along the ramps 9 inside the curvilinear guides 7*b*, to their coupling position 8*c*. Since the elastic device 6 is no longer subjected to compression by the coupling balls 5*a*, the latter are pushed back R2 in reverse (see FIG. 2), in translation inside the axial guides 7*a*, axially distant from the elastic device 6, following the relaxing of the elastic device 6 at the threshold of its prestressing between the sections 1*a*, 1*b*.

When the coupling balls 5*a* are placed in their coupling position 8*c*, automatic re-coupling is obtained between the column 1 and the mounting 2 of the steering wheel maneuverable by the driver of the vehicle. Since the jolts are brief—typically of a duration of less than half a second—the driver can steer the vehicle without having felt a jolt transmitted to the column 1 at its distal end.

A jolt to which the column 1 is subjected in the event of a shock supported by a drive wheel of the vehicle—for example in the event of a curb impact or in the event of a shock caused by unevenness of the traffic lane—is not only brief in duration, but also generates a transient torque C1 of reduced amplitude. The extension of the curvilinear guides 7*b* can be limited so as to optimize the number of coupling balls 5*a*—limited to six on the illustrated example—without however unduly increasing the spatial requirement of the coupling system.

Furthermore, the limited extension of the curvilinear guides has another usefulness. In fact, account is taken of a situation in which a decoupling between the column 1 and the mounting 2 would be repetitive and/or would endure beyond a duration acceptable to the driver for allowing him/her to steer the vehicle. The coupling system is furthermore organized to remedy a situation in which the column 1 would be persistently kept in a situation of jamming and/or would suffer jolts at regular intervals. In this regard, priority coupling between the sections 1*a*, 1*b* is provided which allows the driver to keep permanent directional control of the vehicle.

In order to set the coupling system to priority coupling between the sections 1*a*, 1*b*, the driver can maneuver the proximal section 1*b* rotationally until the coupling balls 5*a* are placed in abutment against one or other of the angular stops 8 provided at the ends of the curvilinear guides 7*b*. This causes a connection and helical driving of the distal section 1*a* by the proximal section 1*b* via the coupling balls 5*a* which abut one or other of the angular stops 8 along the direction S1 (see FIG. 1) of a start of rotation of the proximal section 1*b* by the driver.

The driver can therefore in any situation control the trajectory of the vehicle by driving the column 1 via the coupling system which is set by the driver to priority coupling between the sections 1*a*, 1*b*, including potentially at a driving torque greater than the reference torque.

The structural simplicity and the limitation of the number of components of the coupling system should be noted, owing to an accumulation of functions on the part of some of these components, in particular the following components.

With regard in particular to the curvilinear guides 7*b*, these:

authorize decoupling between the sections 1*a*, 1*b* through angular circulation of the mobile link 5—coupling balls 5*a* in particular—with respect to the proximal section 1*b*, due to the start of rotation of the distal section 1*a* subjected to a jolt, with which the coupling link 5 is radially integral;

cause the coupling link 5 to be pushed back against the elastic region 6*a* so as to absorb the axial forces EA1 generated by the jolt applied to the distal section 1*a*, due to the abutment of the coupling link 5 against the ramps 9 and to its circulation in translation inside the axial guides 7*b* included in the distal section 1*a*;

guide the coupling link 5 to its coupling position in re-coupling phase of the sections 1*a*, 1*b* with each other, as a result of the relaxing of the elastic region 6*a* pushing the coupling link 5 back to abut the ramps 9 included in the curvilinear guides 7;

obtain priority coupling between the sections 1*a*, 1*b* via the angular stops 8 limiting the curvilinear guides.

With regard to the elastic region 6*a*, this is used:

to allow the driver to drive the column 1 via the proximal section 1*b* at the reference torque, due to the prestressing of the elastic region 6*a* axially between the sections 1*a*, 1*b*, to absorb, by compressing it through the coupling link 5, the axial forces EA1 generated by a jolt transmitted to the distal section 1*a*, to push back the coupling link 5 to a coupling position of the sections with each other due to its relaxing brought about on cessation of the jolt.

With regard to assembling together of the distal section 1*a* and the proximal section 1*b*, their lasting axial immobilization with respect to each other allows:

the coupling system to be installed at the proximal end of the column 1, while supporting the steering control device, without affecting the driving comfort of the driver, who does not feel—in the event of a jolt—the brief start of relative rotation between the sections 1*a*, 1*b* via the control device integral with the proximal section 1*b*, which is preferably mounted on the collar 4;

the devices set in motion in the event of a jolt supported by the column 1 to be limited to the rotating distal section 1*a* and to the coupling link 5 rotating and in translation.

Furthermore, at least one coupling system can be installed in any region of the column 1 between its axial ends, depending on the space available in the environment of the column 1 and/or potential arrangements specific to the column 1, such as for example for adjusting the position of the steering wheel in relation to the driver and/or for protecting the driver in the event of an accident.

The coupling system is furthermore easy to calibrate depending on the vehicle, according in particular to its weight and drive power—motorized as for a motor vehicle, a cycle or a scooter for example—or supplied with the muscular strength of the actual driver of the vehicle as for a non-motorized cycle, scooter or gyropod.

The weight and the number of components specifically dedicated to automatic decoupling and/or re-coupling between the sections are limited, which assists the adaptation of the coupling system to any wheeled vehicle and which gives the coupling system significant competitivity with respect to its production costs and/or costs of installation on the column in relation to its usefulness and the advantages obtained.

The invention is not limited to the examples described and/or illustrated. For example, it is possible to choose, depending on preferred characteristics, the elastic device, the coupling elements and the helix portions as described below:

the elastic device among the elastic means comprising at least one elastomer ring, a compression spring, at least one spring washer and/or at least one blade;

the coupling elements can be presented in the form of roller elements, chosen among at least balls, rollers oriented axially such as needle rollers and rollers arranged as balls, or even as sliding elements in shapes suitable for sliding chosen among at least rollers, cleats, pins and posts;

the helix portions can be presented in the form of guides consisting of two wings oriented according to two opposing "V" shaped inclines, or in the form of two sets of rectilinear guides oriented according to the two opposed angular inclines, the guides of one set alternating with the guides of the other set, the mobile elements circulating in either one of the sets depending on the direction of rotation of the distal section.

The invention claimed is:

1. A method for neutralizing transient forces generated by a rise of at least one sudden jolt in a steering column (1) of a vehicle, said transient forces being transmitted from a distal end to a steering device for controlling a trajectory followed by the vehicle which is mounted on a proximal end of the column (1), the method comprising the steps of:

in a state of coaxial coupling on a central axis (A1) of the column (1), mounting, in accordance with a reference torque, via a mobile coupling link (5), at least two sections (1a, 1b) of column (1), a distal section (1a) with a proximal section (1b) which is rotationally integral with the control device, and providing an elastic region (6a) pre-stressed axially between the sections (1a, 1b) mounted in the coupling state in accordance with the reference torque, under the effect of a start of rotation of the distal section by a transient torque (C1) greater than the reference torque, causing an automatic decoupling between the distal (1a) and proximal (1b) sections by rotationally driving the coupling link (5) subjected to the transient torque (C1) and by helical guidance of the link (5) in the proximal section (1b), and simultaneously, under the effect of the decoupling between the sections (1a, 1b), driving the coupling link (5) in translation by axial guidance on the section (1a) combined with helical guidance in the distal section (1b) to the elastic region (6a) so as to compress the latter axially between the sections (1a, 1b), the compression being greater than a compression threshold corresponding to a prestressing threshold, then as a result of the cessation of the jolt and correlatively of the exhaustion of the transient forces, causing an automatic re-coupling between the sections (1a, 1b) by relaxing the compressed elastic region (6a), said region being returned to the pre-stressing threshold between the sections (1a, 1b) coupled under the reference torque and the coupling link (5) being returned to the state of coupling of the sections (1a, 1b) with each other.

2. The method of neutralization as claimed in claim 1, wherein the transient forces include an axial force component, the compression of the elastic region (6a) absorbs an axial thrust generated by the axial force component.

3. The method of neutralization as claimed in claim 1, wherein the coupling link (5) is angularly and uniformly distributed on a plurality of interfaces of mobile coupling (5a) between the sections (1a, 1b) along a circumference (CR1), the mobile interfaces (5a) being guided to circulate rotationally and in axial translation, under the effect of a start of rotation of the distal section (1a) with respect to the proximal section (1b), under the following reverse kinematics:

each mobile interface (5a) moves in curvilinear guidance by at least one helix portion of angular range limited along the proximal section, each mobile interface (5a) moves to the elastic region (6a) through an individual axial guide (7a) on the distal section (1a) until the interfaces (5a) abut the elastic region (6a), which produces axial absorption of the transient forces; then as a result of the cessation of the jolt, the re-coupling between the sections (1a, 1b) is caused under reverse kinematics, through the elastic region (6a) relaxing to a pre-stressed threshold, the mobile interfaces then being pushed back by guidance on the distal section in reverse axial translation and reverse curvilinear guidance along the proximal section until the state of coupling of the sections with each other is re-established under the referenced torque.

4. The method of neutralization as claimed in claim 3, wherein when the sections (1a, 1b) are held in the decoupled state, priority coupling between the sections (1a, 1b) is brought about by placing the coupling elements (5a) in abutment against one and/or the other of the angular stops (8), starting with a rotational maneuver operated by an operator of the proximal section (1b) via the control device.

5. An axial and rotational coupling system between a distal section (1a) and a proximal section (1b) of a column (1) for steering a vehicle, dedicated to the implementation of the method as claimed in claim 1, wherein the sections (1a, 1b) are at least partially coaxially interlocked (A1) and coupled by assembly, one inside the other, defining an interlocking region (ZE), said elastic region (6a) including an elastic device (6) axially interlocked, prestressed, between the sections (a, 1b);

wherein the sections (1a, 1b) are coupled together rotationally via a plurality of mobile coupling elements (5a) including said coupling link (5), radially and uniformly interposed between the sections (1a, 1b) in the interlocking region (ZE);

wherein said coupling elements (5a), rotationally linked with the distal section (1a), are assembled mobile on the distal section (1a) along axial guides (7a) uniformly distributed peripherally on the same distal section (1a), and are jointly mounted mobile on the proximal section (1b) in guides (7b) in curvilinear circulation along helix portions (9; 9a) extending individually, from a coupling position (8c), coupling together the sections (1a, 1b) at the reference torque, up to at least one angular stop (8);

wherein in curvilinear circulation, each mobile element (5a) is in a decoupled position of the sections (1a, 1b) in angular offset and in axial offset with respect to the coupling position (8c), the elastic device (6) being compressed in a decoupling position of the sections (1a, 1b) by the mobile elements (5a) axially abutting.

6. The coupling system as claimed in claim 5, wherein each helix portion (9; 9a) of the curvilinear guide (7b) of the proximal section (1b) is in the shape of a "V" and comprises two thrust wings inclined towards the common axis (A1) of the sections (1a, 1b), the wings extending symmetrically on both sides of the coupling position (8c) between sections (1a, 1b), the position assigned to each portion (9; 9a), and wherein each one of said wings has an angular stop (8) at an end, the coupling position (8c) being the position of each guide (7b), the most distant from the elastic region (6a) and the positions of the stops (8) being the closest, and each mobile element (5a) being mounted to circulate between the coupling position (8c) and either one of the angular stops (8) of the distal section (1a) in the direction of rotation of the section (1a).

7. The coupling system as claimed in claim 5, wherein the curvilinear guides (7b) of the proximal section (1b) and the axial guides (7a) of the distal section (1a) include elongated cavities, hollowed on the surface, and are equipped with side walls (11c; 11d), wherein the curvilinear guides (7b) include at least one side wall (11c) forming a longitudinal stop which exerts an axial abutment contact on the mobile elements (5a) in the direction of the elastic region (6a).

8. The coupling system as claimed in claim 7, wherein in the interlocking region (ZE), the distal section (1a) is equipped at a proximal end with an axial interlocking shaft (3) extending inside a collar (4) located in the proximal section (1b), wherein the curvilinear guides (7b) include an inner face (4i) of the collar (4) and the axial guides (7b) on an outer face (3e) of the shaft (3) faces said inner face (4i).

9. The coupling system as claimed in claim 8, wherein the sections (1a, 1b) are axially immobilized together according to a predefined permanent axial mounting position.

10. The coupling system as claimed in claim 7, further including a chain of axial abutments, each one of the axial abutments having the following components connected in the indicated manner:

the elastic device (6) is axially interposed between a first stopper (11a) integral with the distal section (1a) and a second stopper (11b) mounted around the distal section (1a);

the first stopper (11a) having a proximal face (10c) of a distal nut (10a);

the second stopper (11b) abuts the coupling elements (5a), then the coupling elements (5a) abut the longitudinal stop wall (11c) of the corresponding curvilinear guide (7b);

the distal section (1a) and the proximal section (1b) are axially immobilized in relation to each other between a distal nut (10a) and a proximal nut (10b), which are screw-mounted around the distal section (1a), the distal nut (10a) and the proximal nut (10b) are placed on both sides of the proximal section (1b); and the elastic device (6) is prestressed between the distal nut (10a) and the proximal section (1b).

11. The coupling system as claimed in claim 10, wherein the second stopper (11b) is comprised of a distal face (12c) of the collar (4) of the proximal section (1b) and wherein the helix portions (7b) for circulating the coupling elements (5a) in the proximal section include sliders having a distal wall (11d), which abuts the coupling elements (5a) and the longitudinal stop proximal wall (11c), provided by a distal face of a second shoulder (12b) of the collar (4), the distal wall (11d) and the longitudinal stop proximal wall (11c) are parallel, wherein the coupling elements (5a) are in direct contact with the elastic device (6).

12. The coupling system as claimed in claim 10, wherein the second stopper (11b) includes a distal face of a third shoulder (12c), which includes a sleeve (13) mounted to slide axially around the distal section (1a), each helix portion including a ramp (9) having only the longitudinal stop proximal wall (11c) and the sleeve (13), which acts as the second stopper (11b) having a step which extends axially to abut the coupling elements (5a).

13. The coupling system as claimed in claim 5, further including a running gear (14) radially interposed between the distal section (1a) and the proximal section (1b) at a proximal end, wherein the running gear (14) includes an inner ring (14b), axially blocked between the proximal nut (10b) and a first shoulder (12a) of the distal section (1a), and an outer ring (14a), axially blocked between a second inner shoulder (12b) formed on the proximal section (1b) and a flange (15) axially fastened to the proximal section (1b) at the proximal end.

14. The coupling system as claimed in claim 5, wherein the elastic device (6) is selected from the group consisting of an elastomer having a shape of a ring, a compression spring, at least one spring washer, and at least one blade.

15. The coupling system as claimed in claim 5, wherein the coupling elements (5a) are roller elements selected from the group consisting of at least balls; rollers oriented axially including needle rollers, rollers arranged as balls; and sliding elements including rollers, cleats, pins, or posts.

16. The coupling system as claimed in claim 5, wherein the helix portions (7b) are in a form of guides having two wings oriented according to two opposing inclines in a "V" shape, or in the form of two sets of rectilinear guides oriented according to the two opposed angular inclines, the guides of one set alternating with the guides of the other set, and the mobile elements circulating in either one of the sets depending on the direction of rotation of the distal section.

17. A column (1) for steering a vehicle including at least one set of sections (1a, 1b), including a distal section (1a) and a proximal section (1b), rotationally and axially coupled together, wherein said sections (1a, 1b) are coupled together via a coupling system as claimed in claim 5.

18. The column (1) for steering a vehicle as claimed in claim 17, wherein the coupling system is installed on the column (1) at the proximal end, the proximal section (1b) being arranged as a mounting (2) for said device for controlling the trajectory followed by the vehicle.

19. A traveling vehicle equipped with a column for steering the vehicle connected at a distal end to at least one wheel of the vehicle and provided at the proximal end with a device for controlling the trajectory followed by the vehicle, wherein the steering column (1) conforms to claim 17.

* * * * *